UNITED STATES PATENT OFFICE.

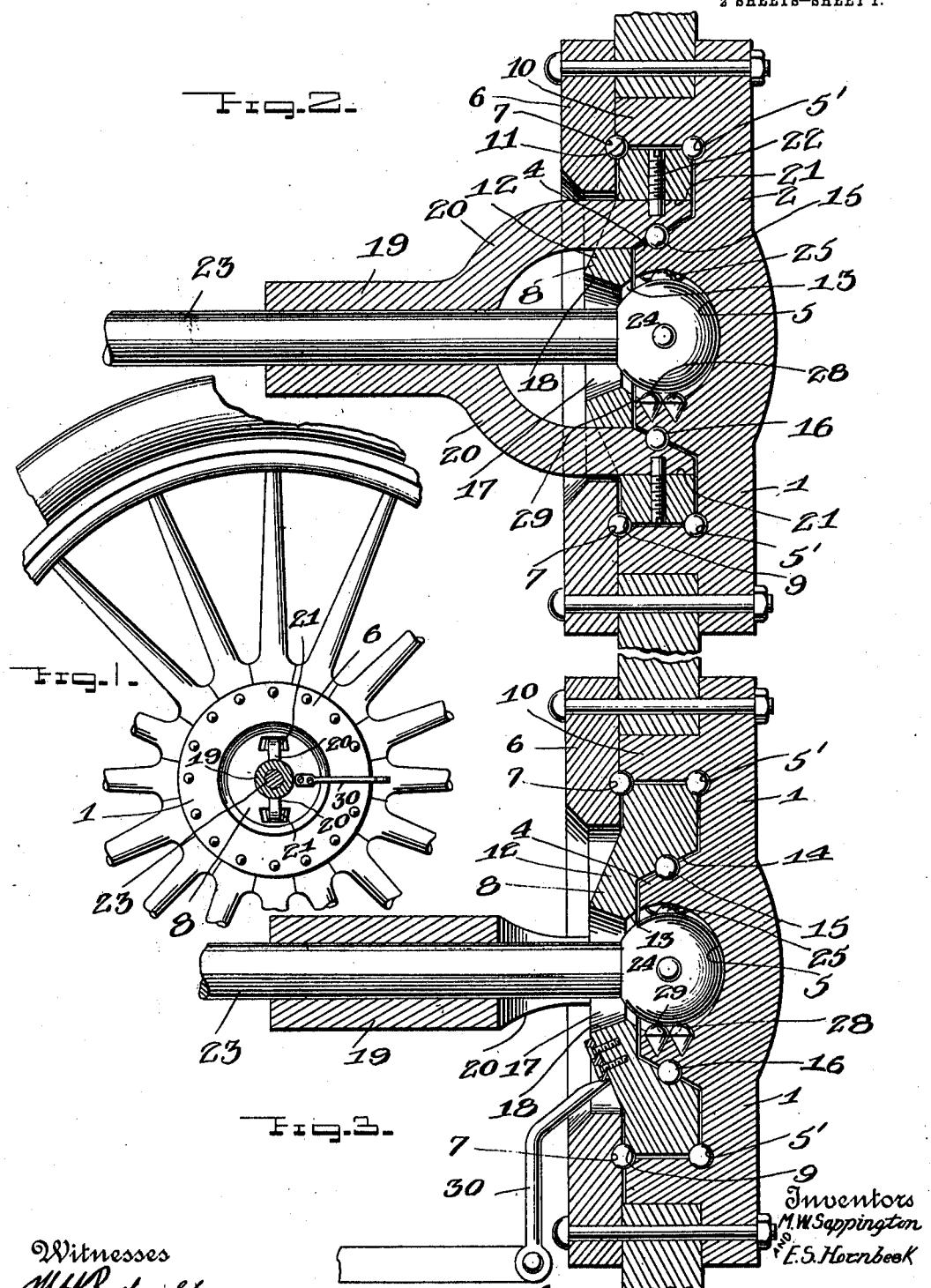

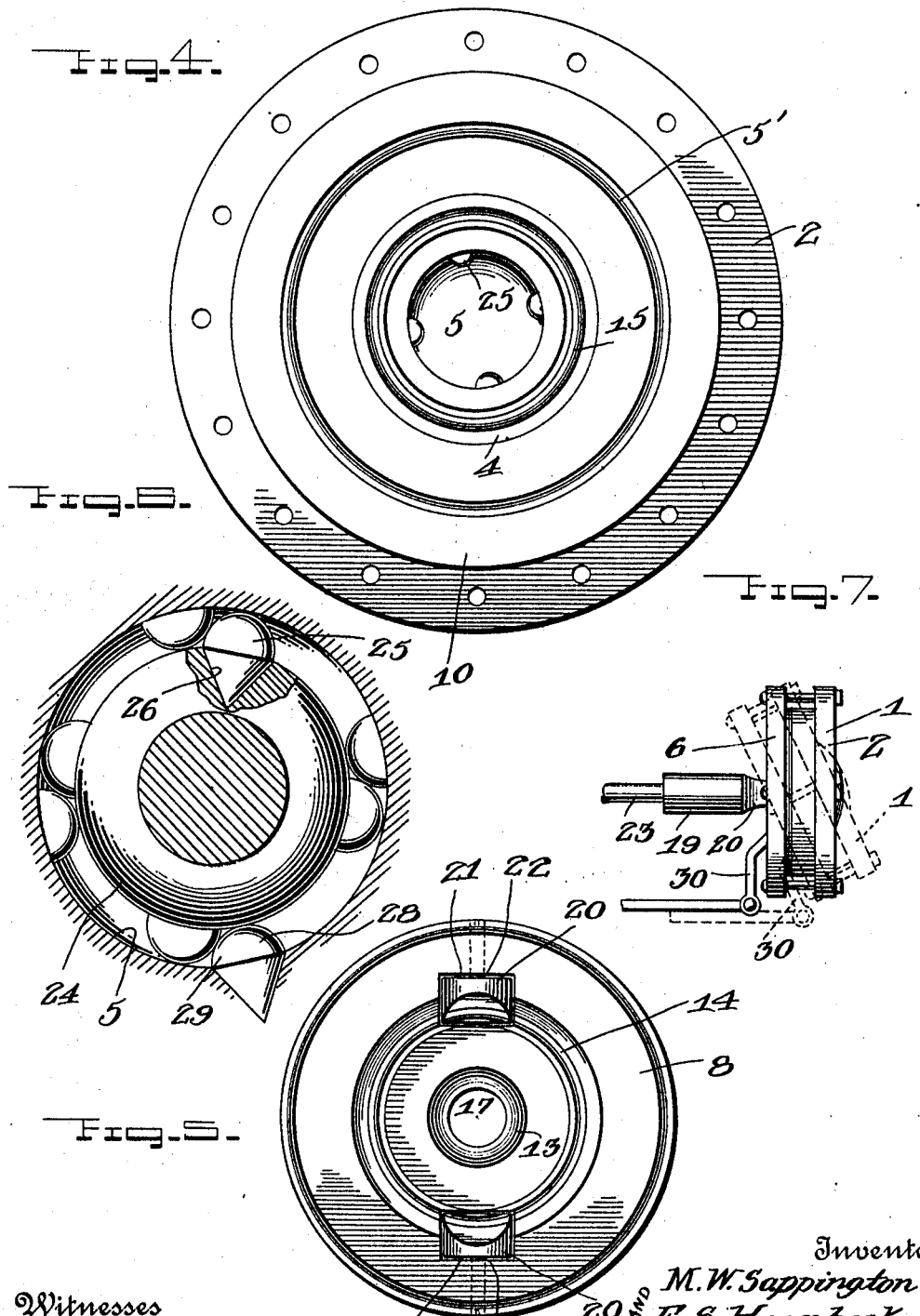

MERRICK W. SAPPINGTON AND EDWARD S. HORNBEEK, OF WINCHESTER, ILLINOIS.

FRONT DRIVING AND STEERING MECHANISM FOR MOTOR-VEHICLES.

990,073.  Specification of Letters Patent.  Patented Apr. 18, 1911.

Application filed September 8, 1910. Serial No. 580,961.

*To all whom it may concern:*

Be it known that we, MERRICK W. SAPPINGTON and EDWARD S. HORNBEEK, citizens of the United States, residing at Winchester, in the county of Scott and State of Illinois, have invented certain new and useful Improvements in Front Driving and Steering Mechanism for Motor-Vehicles; and we do declare the following to be a full, clear, and exact description of the invention, such as will enable others skilled in the art to which it appertains to make and use the same.

This invention relates to improvements in the front driving and steering mechanism of motor vehicles.

One object of the invention is to provide an improved construction of driving mechanism adapted to be applied to the front wheels of a motor vehicle whereby the propulsion and steering of the latter are greatly facilitated.

Another object is to provide a front driving mechanism for motor vehicles having in connection therewith means whereby the machine may be readily steered and whereby should the steering mechanism become broken or disabled, the front wheels will right themselves and run straight on a smooth road.

With the foregoing and other objects in view, the invention consists of certain novel features of construction, combination and arrangement of parts as will be more fully described and particularly pointed out in the appended claims.

In the accompanying drawings: Figure 1 is a vertical cross sectional view through the front axle and supporting sleeve showing a side view of the inner side of the wheel hub and a portion of the wheel; Fig. 2 is a vertical cross sectional view through the wheel; Fig. 3 is a horizontal sectional view of the same; Fig. 4 is a detail inner side view of the outer portion of the wheel hub showing the arrangement of the socket which receives the outer end of the axle; Fig. 5 is a detail side view of the inner side of the hub engaging member of the axle frame or bearing sleeve; Fig. 6 is an enlarged detail vertical sectional view through the central portion of the wheel hub and the adjacent end of the axle showing more clearly the construction and arrangement of the axle engaging devices on the axle and in the hub. Fig. 7 is a small detail view of the end of the axle and the hub showing in dotted lines the manner in which the hub is turned when steering the machine.

Referring more particularly to the drawings, 1 denotes the hub of the front wheel of our improved driving and steering mechanism, said hub comprising an outer circular plate 2 having formed in the inner side of its central portion a substantially semicircular socket 5 the inner portion of which is formed by an annular cone shaped projection 4 on the inner side of the plate. In the inner side of the plate 2 midway between the projection 4 of the socket and the outer edge of the plate is formed an annular groove 5′ which constitutes one part of a ball race. The inner member of the hub 1 comprises an annular centrally apertured plate or ring 6 the diameter of which corresponds to the diameter of the plate or outer member 2 of the hub. In the inner side of the ring 6 opposite to the groove 5′ in the inner side of the plate 2 is formed an annular groove 7 which constitutes one part of a second ball race.

Arranged within the hub between the plates 2 and 6 is the inner bearing member 8 of the axle sleeve or frame upon which the wheel is adapted to revolve. In the opposite outer corners of the bearing member 8 are formed annular grooves 9 which form other parts of the ball races of which the grooves 5′ and 7 form a part. Arranged around the bearing member 8 between the plate 2 and the ring 6 is an annular bearing ring 10 having formed in its opposite inner corners annular grooves 11 which complete the ball races between the bearing member 8 and the revolving portions of the wheel hub. In the ball races thus formed are arranged annular series of bearing balls upon which the wheel revolves and which support the weight of the vehicle through the bearing member 8 as will be readily understood. The annular channel formed by the outer portions of the plate 2 and ring 6 and the bearing ring 10 is adapted to receive the inner ends of the spokes of the wheel. The inner portion of the bearing member 8 is in the form of an annular outwardly extending oval shaped projection 12 having formed in its inner side a substantially semi-circular socket 13 which practically forms a continuation of the socket 3 in the outer plate 2 of the hub. The outer edge of the socket 13 is flared outwardly to form an annular inclined surface 14 which lies adjacent to the outer surface of the cone shaped projection 4 on the inner side of the plate 2 around the socket 3. If desired the adjacent surfaces of the cone shaped projection 4 and the flared outer portion 14 of the socket 13 may be provided with annular grooves which form a ball race 15 which is adapted to receive bearing balls 16 whereby an anti-frictional engagement is had between these parts. In the inner side of the oval shaped projection of the bearing member 8 is formed a centrally disposed annular passage 17 the walls of which are beveled or flared outwardly as shown at 18.

The axle engaging or outer portion of the bearing member of the wheel comprises a sleeve 19 having on its outer ends laterally curved longitudinally extending arms 20, the outer ends of which are engaged with passages 21 formed in the inner portion 8 of the bearing member as clearly shown in Fig. 2 of the drawings. The engaging ends of the arms 20 are pivotally connected in the passages 21 with the inner portion of the bearing member by suitable pivot pins 22 engaged therewith as shown. The walls of the passages 21 flare or diverge outwardly toward the outer side of the bearing member to provide space for the arms 20 when the wheel is turned at an angle in either direction.

Revolubly mounted in the sleeve 19 is a front driving axle 23 the outer end of which projects through the aperture 17 and into the recess or space formed by the sockets 3 and 13 of the hub and bearing member of the wheel. On said outer end of the axle is formed a spherical head or ball 24 in the outer surface of which is arranged a series of driving lugs 25 which are preferably in the form of teeth having tapered or pointed inner ends 26 which are adapted to be driven or otherwise secured in the outer surface of the ball or spherical head 24 of the axle and which are provided with a rounded or oval shaped outer end which, when the teeth are secured to the ball project outwardly a suitable distance therefrom and form the driving lugs 25.

Arranged in the socket 5 on the plate 2 in line with the lugs 25 when the latter are in operative position, is an annular series of driving lugs 28 which have their outer projecting ends in the form of double oval shaped projections 29, said lugs being provided with any suitable form of attaching shanks which are secured to the inner wall of the socket 5 in any suitable manner. By providing the projecting outer ends of the lugs 28 with double rounded or oval shaped surfaces and arranging the same as shown, the projecting oval shaped ends of the lugs 25 on the head 24 of the axle will, when engaged with said projecting ends of the lugs 28, tend to hold the wheel in a straight line or at right angles to the axle thus assisting in keeping the vehicle in a straight course and whereby, should the steering mechanism become disabled the engagement of the oval ends of the lugs 25 on the axle with the double oval projections of the lugs on the hub of the wheel, will automatically bring the wheel into a straight line and hold the same in this position while the machine is moved over smooth roads. By thus engaging the outer end of the axle with the hub of the wheel the latter will be revolved when the axle is turned irrespective of the position or angle of the wheel on the end of the axle thus providing an efficient and reliable driving mechanism for the front wheels of the vehicle.

Rigidly connected to or formed integral with the outer portion 12 of the bearing member 8 is an inwardly and rearwardly projecting steering arm 30 with the outer end of which is connected the usual or any suitable form of steering rod whereby the bearing member 12 and hub of the wheel may be turned on the pivot pins 22 and end of the axle thereby providing an efficient means whereby the machine may be readily steered in the desired direction. By arranging the pivotal connection between the movable parts of the wheel the stationary portion of the bearing or coupling in a direct line with the center of the spherical head on the outer end of the axle the turning of the wheel for steering the machine will be greatly facilitated.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as defined in the appended claims.

Having thus described our invention, what we claim is:

1. In a front driving and steering mechanism for motor vehicles, a bearing member comprising an axle engaging sleeve, having a bifurcated outer end, an outer bearing section pivotally mounted on the bifurcated end of said sleeve, a hub revolubly mounted on said bearing member and having a round recess therein, a front driving axle arranged in said sleeve and having a spherical head projected into the recess in said hub, concentric rows of driving lugs arranged in the socket of said hub and having oval-shaped outer faces, and an annular series of driving lugs arranged on the face of said spherical axle head and having oval-shaped outer faces and arranged to extend between and engage the adjacent faces of the double row of lugs in the hub socket whereby the wheel is driven and will be automatically held in a straight course.

2. In a front driving and steering mechanism for motor vehicles, a bearing member comprising a hub composed of an outer circular plate having a centrally disposed semi-circular socket formed in its inner face, an annular cone-shaped projection surrounding said socket, an annular spacing flange arranged on the inner face of said plate between said projection and the periphery of the plate, an inner member comprising an annular plate of a diameter corresponding to the diameter of the outer plate, means for securing said inner and outer plates together, an inner bearing member arranged between said plates in the space formed by the annular flange and cone-shaped projection on the outer plate, ball bearings arranged between said members, said bearing member having an outwardly extending oval-shaped projection with a semi-circular socket on its inner face arranged to register with the socket in said outer plate, the outer walls of said socket being flared outwardly, said inner member having passages extending transversely therethrough with the walls of said passages flared outwardly, an axle engaging sleeve having its outer end bifurcated and the arms thereof extending into the passages of said bearing member and having beveled inner faces engaging the cone-shaped member of said outer plate, means pivotally connecting said arms with said bearing member, and an axle revolubly mounted in said sleeve and having a spherical head arranged in the sockets of said outer plate and bearing member and means on said head and on the face of one of said sockets for driving and automatically holding the wheel in a straight course.

In testimony whereof we have hereunto set our hands in presence of two subscribing witnesses.

MERRICK W. SAPPINGTON.
EDWARD S. HORNBEEK.

Witnesses:
GEO. W. HOGAN,
CHARLES S. DOYLE.

---

Copies of this patent may be obtained for five cents each, by addressing the "Commissioner of Patents. Washington, D. C."